United States Patent [19]
Schnelker

[11] Patent Number: 5,232,066
[45] Date of Patent: Aug. 3, 1993

[54] SNOWMOBILE COOLER PROTECTOR

[76] Inventor: Irwin W. Schnelker, 16220 Venison Trail, Woodburn, Ind. 46797

[21] Appl. No.: 845,234

[22] Filed: Mar. 3, 1992

[51] Int. Cl.$^5$ ............................................. B60K 11/00
[52] U.S. Cl. ................................. 180/190; 180/68.4; 180/68.6
[58] Field of Search ................ 180/68.1, 68.4, 182, 180/190, 68.6

[56] References Cited

U.S. PATENT DOCUMENTS

| | | | |
|---|---|---|---|
| 3,734,221 | 5/1973 | Labelle | 180/5 |
| 3,773,127 | 11/1973 | Aaen | 180/5 |
| 3,810,518 | 5/1974 | Smale | 180/54 |
| 3,819,000 | 6/1974 | Larsen | 180/5 |
| 3,835,948 | 9/1974 | Duclo | 180/5 |
| 3,870,115 | 3/1975 | Hase | 180/5 |
| 3,871,460 | 3/1975 | Dehnert | 180/5 |
| 3,877,536 | 4/1975 | Earhart | 180/5 |
| 3,901,335 | 8/1975 | Johnson | 180/68.4 |
| 3,981,373 | 9/1976 | Irvine | 180/5 |
| 4,237,997 | 12/1980 | Swanson | 180/272 |
| 4,249,626 | 2/1981 | Fields | 180/54 |
| 4,278,302 | 7/1981 | Westimayer | 305/35 |
| 4,535,866 | 8/1985 | Shiga | 180/68.4 |
| 4,671,521 | 6/1987 | Talbot | 280/16 |

FOREIGN PATENT DOCUMENTS 0099418  7/1980  Japan ................... 180/68.1

Primary Examiner—Margaret A. Focarino
Assistant Examiner—Victor E. Johnson
Attorney, Agent, or Firm—Baker & Daniels

[57] ABSTRACT

A snowmobile has an engine with a liquid cooling system and a housing defining a tunnel with a track disposed therein. The track is carried by a suspension assembly including a drive sprocket, and the drive sprocket is connected to and driven by the engine. A heat exchanger is disposed within the tunnel and is in fluid communication with the cooling system for cooling the liquid. A protecting apparatus protects the heat exchanger from contact with and damage by the track. The protecting apparatus includes a pair of protective brackets fastened to the housing which restricts the outward and radial movement of the track and prevents the track from impinging upon the heat exchanger.

19 Claims, 2 Drawing Sheets

SNOWMOBILE COOLER PROTECTOR

BACKGROUND OF THE INVENTION

Field of the Invention

The present invention relates to snowmobiles and, more particularly, the field of the invention is that of an apparatus for protecting a heat exchanger of a snowmobile having a liquid cooled engine wherein the heat exchanger is located in the tunnel adjacent to the track.

Description of the Related Art

It is known in the art to provide protective shields between the rotating track and other parts of the snowmobile adjacent the track. Such shields typically are in the form of a protective housing forming a tunnel wherein the track is rotatably disposed. U.S. Pat. Nos. 3,981,373 to Irvine and 3,870,115 to Hase both disclose snowmobiles having such a housing. Similarly, U.S. Pat. No. 3,734,221 to Labelle discloses an endless track snowmobile which rotatably carries a track between two housings represented by a front panel and a hood to isolate the track and protect the various other components, such as the engine. A plurality of shielded openings, which apparently form a plenum in the hood and front panel, are provided for allowing air to circulate through the housing and thereby cool the internal combustion engine.

It is also known in the art to provide a liquid cooling system to cool an internal combustion engine of a snowmobile. For example, U.S. Pat. No. 4,249,626 to Fields, et al. discloses a snowmobile having a liquid cooling system disposed within a housing adjacent the inside of the engine compartment hood. Cooling air enters the housing through a plurality of air guides and is directed through a heat exchanger and out a panel vent. Such an apparatus operates to effectively cool the internal combustion engine disposed within the engine compartment.

Some snowmobiles having a liquid cooled engine include a heat exchanger which is disposed adjacent the track at the forward end of a tunnel formed by the housing. The heat exchanger of necessity is disposed on the track side of the housing and is not covered by the housing so that air and/or snow may circulate around and heat may be convected therefrom. The heat exchanger includes a plurality of outwardly extending fins to facilitate the heat transfer The track generally maintains contact with a driving sprocket and a plurality of guiding sprockets or runners. However, the track may come out of contact with the driving sprocket and into contact with the heat exchanger, thereby possibly damaging the heat exchanger.

More particularly, a suspension assembly generally includes a cylindrical driving sprocket at the forward end of the suspension assembly which receives rotational input power from the internal combustion engine of the snowmobile. As rotational input power is applied to the driving sprocket, the driving sprocket applies a rotary torque and resultant generally uniform tension (i.e., pulling) force to the track. However, the rotary motion of the track, resulting from the rotary torque imparted by the driving sprocket, may be transferred into linear motion of the track away from the driving sprocket. That is, the momentum of the track in a direction partially radially outward from the driving sprocket may cause the track to move away from the driving sprocket in a linear direction, e.g., in a linear direction toward the heat exchanger.

If the track impinges upon the plurality of outwardly extending fins of the heat exchanger, the heat exchanger fins may be bent, broken off, or otherwise damaged by the track. If the plurality of fins are bent, circulation of air between the fins is decreased, thereby decreasing the cooling efficiency of the heat exchanger. Moreover, if any of the plurality of fins are broken off, the available surface area for cooling is reduced, thereby further reducing the cooling efficiency of the heat exchanger.

This propensity to damage the heat exchanger is further increased by the relatively common practice of having metal spikes attached to the track. The spikes are generally frustroconical in shape and are formed at the base end to attach to the track. For example, each of the spikes may be formed with a threaded male base which threadably engages a threaded female receptacle fixed in the track. The spikes enhance traction but also may severely damage the heat exchanger. That is, the plurality of rapidly moving metal spikes may impinge upon the heat exchanger and thereby bend, puncture or otherwise damage the heat exchanger. At a minimum, damaging the outwardly extending fins of the heat exchanger decreases its cooling efficiency. At a maximum, damaging the body of the heat exchanger to an extent whereby cooling fluid is allowed to escape may cause the engine to overheat and become damaged.

A heat exchanger as described above is normally constructed from a metal which is easy to extrude or mill and which is a good conductor of heat. However, metals having such properties, e.g., aluminum, are relatively soft with respect to other metals, e.g., steel, and cannot withstand physical impact from the metal spikes or track without being damaged. Accordingly, a heat exchanger of the type which is normally disposed in a tunnel of a snowmobile having a liquid cooled engine cannot provide its own protection against damage resulting from impingement by the metal spikes or track. What is needed in the art is an apparatus for protecting a heat exchanger disposed in a tunnel adjacent a track which prevents damage to the heat exchanger but does not adversely affect the cooling efficiency of the heat exchanger.

SUMMARY OF THE INVENTION

The present invention is a protector for a heat exchanger of a snowmobile having a liquid cooled engine. In a snowmobile having the liquid heat exchanger disposed within the tunnel near the track, the track may fly radially and outwardly from the driving sprockets and impinge upon the heat exchanger. The impinging track may damage the heat exchanger fins and reduce its cooling efficiency or puncture the heat exchanger and allow the loss of the coolant. The protector prevents the track from impinging on the exterior of the heat exchanger by physically blocking movement of the track into the heat exchanger.

Accordingly, the present invention provides a pair of protector brackets adapted to extend around a heat exchanger disposed adjacent to a track in a snowmobile having a liquid cooled engine. The protector brackets prevent the track from contacting and thereby damaging the heat exchanger. The protector brackets effectively protect the heat exchanger but cover a relatively small portion of the surface area of the heat exchanger. Thus, the present invention provides adequate protection to the heat exchanger from impingement by and damage from the track, while not significantly impairing its cooling function.

The invention comprises, in one form thereof, a snowmobile having an engine with a liquid cooling system. A housing defines a tunnel having a track disposed therein. The track is carried by a suspension assembly including a drive sprocket, and the drive sprocket is connected to and driven by the engine. A heat exchanger is disposed within the tunnel and is in fluid communication with the cooling system for cooling the liquid. An apparatus for protecting the heat exchanger from contact with and damage by the track is provided. The protecting apparatus restricts the outward and radial movement of the track and prevents the track from impinging upon the heat exchanger.

In another form of the invention, the heat exchanger has a hollow generally triangular cross section closed at each end defining a reservoir, an inlet and an outlet in fluid communication with the cooling system, and a plurality of outwardly extending fins for cooling the liquid circulated therein. The protecting apparatus is formed to extend at least partially around two sides of the heat exchanger and attach to the housing.

In yet another form of the invention, the protecting apparatus is a pair of protector brackets including first and second flat plate members having first and second ends. The first ends of the first and second flat plate members are rigidly fastened to each other and the second ends are adapted to be fastened to the housing.

An advantage of the present invention is that the protector brackets provide the simultaneous dual functionality of protecting the heat exchanger from contact with and damage by the track, while not impeding the heat transfer rate from the heat exchanger.

Another advantage is that the protector brackets may be easily installed on a new or already existing snowmobile.

A still further advantage is that very little machining is required to manufacture the protector brackets.

Yet another advantage is that the protector brackets may be easily removed and/or replaced by an operator.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DETAILED DESCRIPTION OF THE INVENTION

Figure 1:
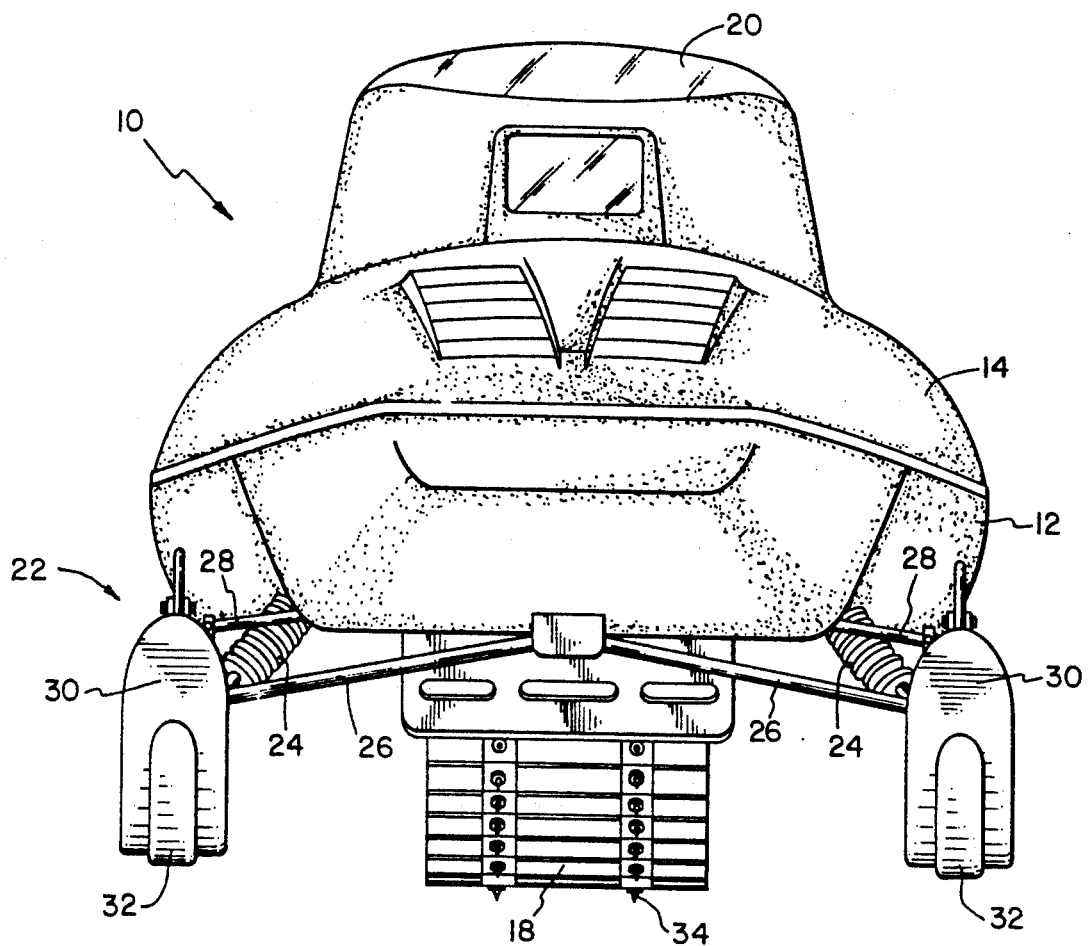
FIG. 1 is a front view of a snowmobile having a liquid cooled engine with a heat exchanger disposed within a tunnel adjacent the track.
Figure 3:
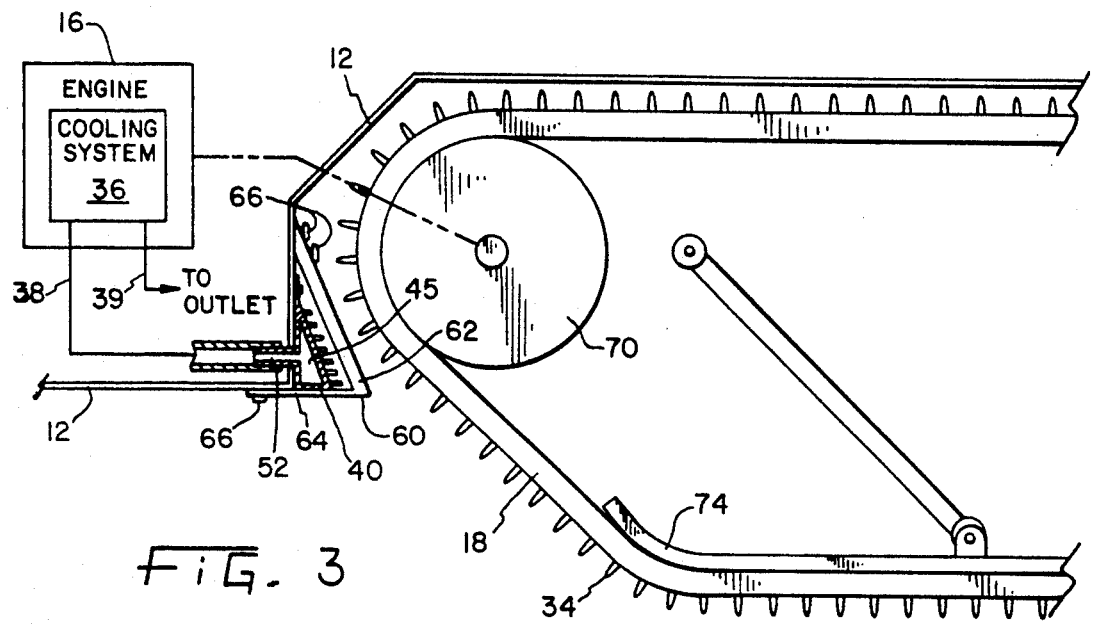
FIG. 3 is a partial side sectional view of the snowmobile of FIG. 1 showing the housing, track, heat exchanger and protector brackets.

Referring now the drawings and particularly to FIG. 1, there is shown a snowmobile 10 having a liquid cooled engine 16 (shown in block form in FIG. 3). Snowmobile 10 includes housing 12 which mates with hood 14 to enclose and carry the liquid cooled engine 16. Fixed to the upper surface of hood 14 is a wind shield 20 for at least partially deflecting the flow of air away from an operator during use of snowmobile 10. In the embodiment shown, housing 12 is formed to provide an engine pan 13 for supporting engine 16, and a tunnel 15 (FIG. 3) which partially encloses track 18. Alternatively, the engine pan 13 and tunnel 15 may be separately formed using conventional metal stamping techniques.

Suspension and steering assembly 22 extends downwardly from housing 12 and includes shock absorbers 24, tie rods 26 and steering rods 28 which are attached to skis 30. Skis 30 may be provided with wearbars 32 to prevent undue wear on the skis 30 caused by contact between skis 30 and the ground.

Liquid cooled engine 16 (FIG. 3) includes liquid cooling system 36 of conventional design. Liquid cooling system 36 may include, for example, a plurality of liquid passageways (not shown) formed within engine 16 and a circulating device (not shown) such as a pump to circulate cooled liquid through the engine 16. Liquid cooling system 36 is in fluid communication with a heat exchanger 40 via an inlet liquid conduit 38 and an outlet liquid conduit 39.

Liquid cooled engine 16 is attached to and supplies rotational power to front drive sprocket 72, which in turn rotatably drives a track 18. Track 18 (FIG. 3) is rotatably carried by a suspension assembly including front drive sprocket 70, and a plurality of guide runners 74, and guide sprockets (not shown). Track 18 may optionally be provided with a plurality of metal spikes 34 to enhance the traction between the ground and the snowmobile 10.

Heat exchanger 40 is adapted to cool the liquid circulated by liquid cooling system 36 and is of conventional design including a hollow elongate body 42 defining a triangular cross section. At each end of hollow elongate body 42 are end portions 44 which coact with hollow elongate body 42 to form reservoir 45 wherein the cooling fluid may be circulated. Extending outwardly from hollow elongate body 42 are a plurality of cooling fins 46 for conducting heat away from hollow elongate body 42 and convecting the heat to the atmosphere. At the upper end of hollow elongate body 42 is an outwardly extending flange 48 having a plurality of mounting holes 50 formed therein for fastening the heat exchanger 40 to the housing 12. To circulate fluid within the hollow elongate body 42, heat exchanger 40 is provided with an inlet 52 and an outlet (not shown) which extend outwardly from the hollow elongate body 42. In the embodiment shown, the inlet and outlet are symmetrically fixed to the hollow elongate body 42 and extend through a cutout in tunnel 15. Thus, in the embodiment of FIG. 3, the outlet of heat exchanger 40 lies immediately behind the inlet 52.

The circulating device of cooling system 36 causes the cooling liquid to be transported through inlet liquid conduit 38 to inlet 52 and into hollow elongate body 42 (FIG. 3). Heat exchanger 40 operates to sufficiently cool the cooling liquid which is then transported through the outlet and outlet liquid conduit 39 back to the cooling system 36.

In accordance with the present invention, snowmobile 10 includes protector brackets 60. In the embodiment shown in FIGS. 2-4, a pair of protector brackets 60 are provided and each protector bracket includes flat plate members 62 and 64 which are rigidly fastened to each other at a common end by, e.g., welding. Flat plate members 62 and 64 preferably have a width X (FIG. 4) of 1 inch. Flat plate members 62 and 64 are fastened to each other such that the angle $\alpha 1$ (FIG. 4) therebetween is about the same as the angle $\alpha 2$ (FIG. 4) formed by outwardly extending fins 46 and the bottom of heat exchanger 40. Protector brackets 60 thus lie closely adjacent to heat exchanger 40 when in an installed position. The angles $\alpha 1$ and $\alpha 2$ are acute, for example, 67° in the preferred embodiment.

In the embodiment shown, hollow elongate body 42 of heat exchanger 40 has a generally triangular cross section; however, the specific geometric configuration of the hollow elongate body 42 may vary and such variations are considered within the scope of this invention. For example, hollow elongate body 42 could be formed with a generally rectangular cross section and the plurality of fins 46 could extend outwardly therefrom. Moreover, although the angles $\alpha 1$ and $\alpha 2$ are shown identical in FIG. 4, the angles $\alpha 1$ and $\alpha 2$ need not be identical as long as protector brackets 60 can extend around and thereby protect heat exchanger 40.

Protector brackets 60 are provided with at least one hole in each outer end of flat plate members 62 and 64 for fastening the bracket 60 to the housing 12. In the embodiment shown, flat plate member 62 is provided with two holes adapted to receive fasteners 66 for fastening flat plate member 62 to housing 12, and flat plate member 64 is provided with one hole to receive fasteners 66 for fastening flat plate member 64 to housing 12.

Figure 4:
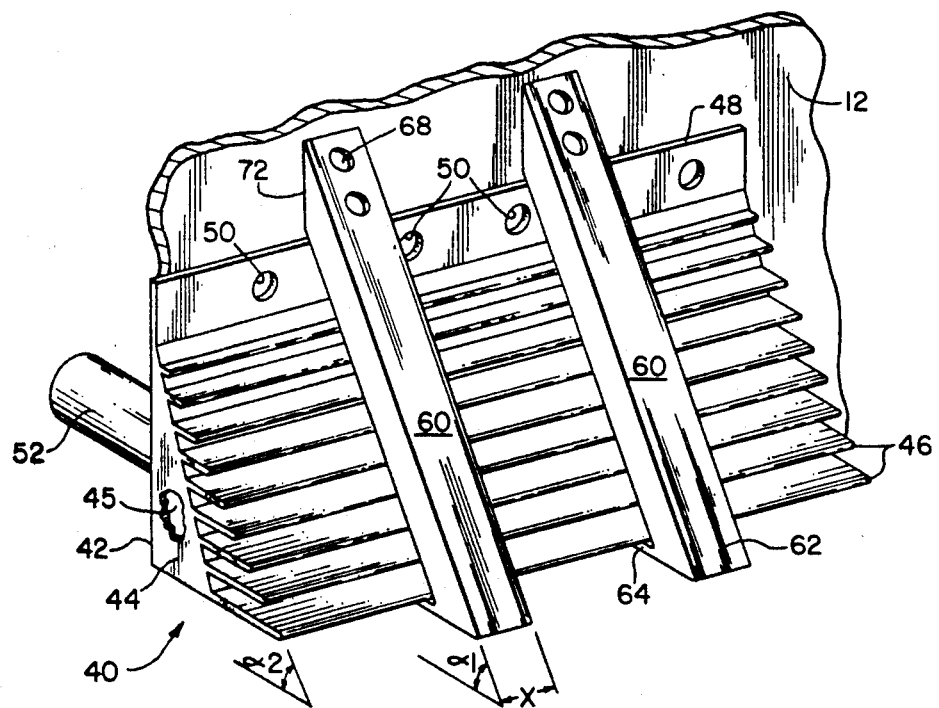
FIG. 4 is a perspective view, in partial cut-away, of the heat exchanger and protector brackets attached to the forward wall of the housing.

As shown in FIGS. 3 and 4, end 72 of flat plate member 62 lying adjacent to housing 12 is formed with a bevel 72 so that the end of flat plate member 62 lies flush with housing 12. In the embodiment shown, flat plate member 62 is formed from metal barstock having a cross sectional area which is larger than the cross sectional area of flat plate member 64 (both have the same width X). This is because, as shown in FIG. 3, track 18 having studs 34 will only contact flat plate member 62 upon disassociation between front driving sprocket 70 and track 18. Thus, flat plate member 64 functions to support flat plate member 62 in the position shown and does not come into contact with track 18 or studs 34. Accordingly, flat plate member 64 need not, but may, have cross sectional dimensions the same as flat plate member 62. In an alternative embodiment, protector bracket 60 may be formed from a single piece of barstock such that flat plate members 62 and 64 have the same cross sectional dimensions.

Figure 2:
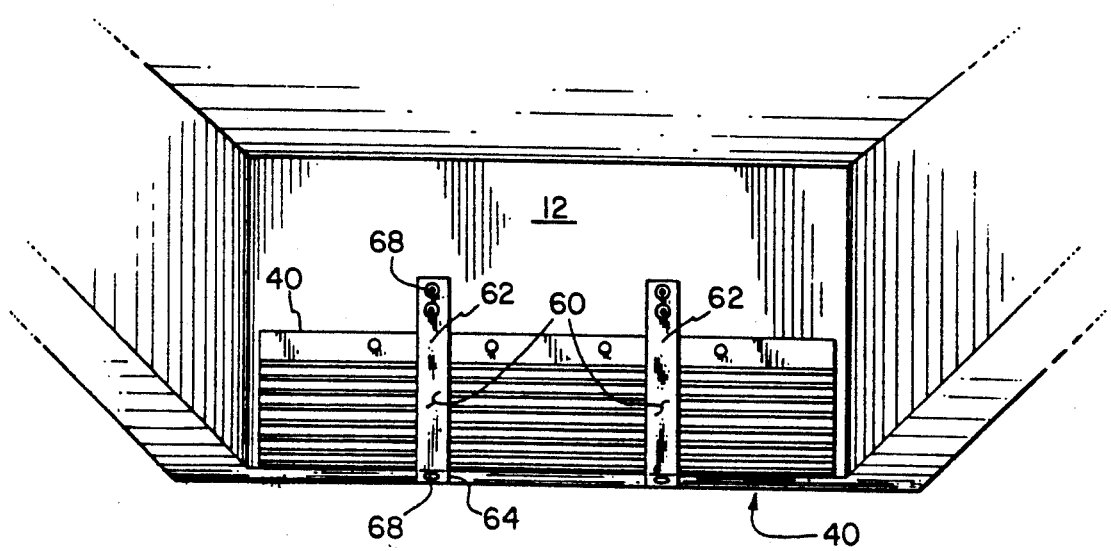
FIG. 2 is a rear view of the heat exchanger and protector brackets installed on the snowmobile of FIG. 1.

Protector bracket 60 may be formed, in an alternative embodiment, by preforming beveled end 72 and mounting holes 68 and subsequently bending the protector bracket 60 to form the bracket as shown in FIGS. 2-4. As will be apparent to those skilled in the art, when flat pate members 62 and 64 are formed from a single piece of metal with a bending operation, the interface between flat plate members 62 and 64 will not be a sharp point as shown in FIGS. 3-4. Instead, the interface will have a radius of curvature which is formed during the bending operation.

The protector brackets of the present invention, as described above, may be sold in kit form for installation on a snowmobile having a heat exchanger as described above. The kit could include, for example, a pair of protector brackets 60 and six fasteners 66 to attach the protector brackets to the housing 12. Fastening means 66 are preferably pop-rivets, but may be any other suitable fastening mechanism.

Installation of the kit may be accomplished as follows: Track 18 and front drive sprocket 70 are removed from within housing 12. Protector brackets 60 are individually placed over the heat exchanger 40 in a position such as shown in FIGS. 2-4. While holding the protector brackets 60 in place, a hole is drilled through the housing 12 at a location corresponding to each of the mounting holes 68. A fastener 66 is then inserted in each of the mounting holes 68 to fasten the protector bracket 60 to the housing 12. Front drive sprocket 70 and track 18 may then be replaced and the snowmobile 10 may be subsequently used without damage to heat exchanger 40 from studs 34 or track 18.

During operation, driving sprocket 70 rotatably drives the endless track 18. As the majority of the rotatable driving force is exerted by the driving sprocket 70 against the track 18 at the upper and upper forward portion of drive sprocket 70, the track 18 may come out of contact with the drive sprocket 70 at the lower front portion thereof adjacent the heat exchanger 40. This disassociation becomes more prevalent as track 18 elongates from substantial use, or the suspension assembly is compressed from the weight of an operator. Accordingly, the track 18 may come into contact with the heat exchanger 40 and damage the outwardly extending fins 46. If wear continues, outwardly extending fins 46 may be broken off down to the base thereof lying coincident with hollow elongate body 42. Subsequent wear may damage and possibly puncture hollow elongate body 42. Puncturing the heat exchanger 40 may allow the cooling liquid to escape from the heat exchanger 40 resulting in inefficient or no cooling of internal combustion engine 16. Without the cooling fluid, engine 16 may overheat and be further damaged by piston scouring, etc. associated with excessively high temperatures. The present invention provides a protector which prevents damage to the heat exchanger 40 or engine 16.

While this invention has been described as having a preferred design, the present invention can be further modified within the spirit and scope of this disclosure. The terminology used in this disclosure is used for the purpose of illustration of the present invention and not for limitation. This application is therefore intended to cover any variations, uses, or adaptations of the invention using its general principals. Further, this application is intended to cover such departures from the present disclosure as come within known or customary practice in the art to which this invention pertains and which fall within the limits of the appended claims.

What is claimed is:

1. A snowmobile comprising:
   an engine having a liquid cooling system for circulating a liquid coolant;
   a housing forming a tunnel;
   a track disposed within said tunnel and carried by a suspension assembly including a drive sprocket, said drive sprocket connected to and driven by said engine;
   a heat exchanger disposed within and extending into said tunnel, said heat exchanger being in fluid communication with said cooling system for cooling the liquid coolant; and means for protecting said heat exchanger from contact with and damage by said track, said protecting means disposed between said track and said heat exchanger whereby during operation of said snowmobile said track is radially and outwardly propelled by said drive sprocket toward said heat exchanger, and said protecting means prevents said outwardly moving track from impinging and damaging said heat exchanger.

2. The snowmobile of claim 1 wherein said heat exchanger has a hollow body which is generally triangular in cross section, said hollow body having closed ends and defining a reservoir, said heat exchanger having an inlet and an outlet in fluid communication with said cooling system and a plurality of outwardly extending fins for cooling the liquid circulated therein, said protecting means partially extending around said heat exchanger body and attached to said housing.

3. The snowmobile of claim 1 wherein said protecting means comprises a pair of protector brackets, each of said protector brackets including first and second flat plate members, each of said first and second flat plate members having first and second ends, said first ends being rigidly fastened to each other and said second ends adapted to be fastened to said housing.

4. The snowmobile of claim 3 wherein each said bracket has a width of about one inch.

5. The snowmobile of claim 3 wherein said first ends are rigidly fastened to each other by welding.

6. The snowmobile of claim 5 wherein said heat exchanger has a triangular cross section defining a first plane lying adjacent said housing and a second substantially horizontal plane, said heat exchanger having a plurality of cooling fins extending outwardly and defining a third plane lying coincident with outer ends of said cooling fins, said second and third planes forming an angle therebetween of about 67°, said first and second plate members being rigidly fastened to each other at said first ends at an angle between about 67° corresponding to said angle between said second and third planes.

7. The snowmobile of claim 5 wherein said flat plate members are rigidly fastened at an acute angle to each other.

8. The snowmobile of claim 5 further comprising a plurality of fasteners, wherein each of said second ends includes at least one hole, and each of said fasteners is adapted to extend through one of said holes of said second ends and engage said housing to thereby attach said protector brackets to said housing.

9. In a snowmobile having an engine with a liquid cooling system for circulating a liquid coolant and a housing forming a tunnel, said cooling system connected to and in fluid communication with a heat exchanger disposed within and extending into the tunnel for cooling the liquid coolant, said track disposed within said tunnel and rotatably carried by a suspension assembly having a drive sprocket, said drive sprocket being driven by said engine and said track being radially and outwardly propelled by said drive sprocket toward said heat exchanger, the improvement comprising:

means for protecting said heat exchanger from contact with and damage by said track, said protecting means disposed between said track and said heat exchanger whereby said protecting means prevents said outwardly moving track from impinging and damaging said heat exchanger.

10. The snowmobile of claim 9 wherein said heat exchanger has a hollow body which is generally triangular in cross section, said hollow body having closed ends and defining a reservoir, said heat exchanger having an inlet and an outlet in fluid communication with said cooling system and a plurality of outwardly extending fins for cooling the liquid circulated therein, said protecting means partially extending around said heat exchanger body and attached to said housing.

11. The snowmobile of claim 9 wherein said protecting means comprises a pair of protector brackets, each of said protector brackets including first and second flat plate members, each of said first and second flat plate members having first and second ends, said first ends being rigidly fastened to each other and said second end adapted to be fastened to said housing.

12. The snowmobile of claim 10 wherein said first ends are rigidly fastened to each other by welding.

13. The snowmobile of claim 12 wherein said heat exchanger has a triangular cross section defining a first plane lying adjacent said housing and a second substantially horizontal plane, said heat exchanger having a plurality of cooling fins extending outwardly and defining a third plane lying coincident with outer ends of said cooling fins, said second and third planes forming an angle therebetween of about 67°, said first and second plate members being rigidly fastened to each other at said first ends at an angle of about 67° corresponding to said angle between said second and third planes.

14. The snowmobile of claim 12 wherein said flat plate members are rigidly fastened at an acute angle to each other.

15. The snowmobile of claim 10 wherein said protecting means is formed from a single piece of metal.

16. A kit for protecting a heat exchanger having a body which is generally triangular in cross section defining a first substantially vertical plane and a second substantially horizontal plane, said heat exchanger having a plurality of cooling fins extending outwardly and defining a third plane coincident with outer ends of said cooling fins, said second and third plane forming an acute angle therebetween, said heat exchanger disposed adjacent to a track in a tunnel of a snowmobile housing, said kit comprising a plurality of protector brackets adapted to prevent the track from contacting and damaging the heat exchanger, each of said protector brackets including first and second flat plate members, each of said first and second plate members having first and second ends, said first and second plate members being rigidly fastened to each other at said first ends at an angle corresponding to the acute angle between the second and third planes of said heat exchanger.

17. The kit of claim 16 wherein said first ends are rigidly fastened to each other by welding and each of said second ends includes at least one hole.

18. The kit of claim 17 further comprising a plurality of fasteners adapted respectively to extend through said holes of said second ends and thereby attach said protector brackets to said housing.

19. The kit of claim 16 wherein each said protector bracket has a width of about one inch.

* * * * *